（12）United States Patent
Balamane et al.

(10) Patent No.: US 8,988,827 B1
(45) Date of Patent: Mar. 24, 2015

(54) SURFACE DIFFUSION INHIBITOR FOR HAMR NFT

(71) Applicant: HGST Netherlands B.V., Amsterdam (NL)

(72) Inventors: Hamid Balamane, Portola Valley, CA (US); Vijay Prakash Singh Rawat, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/158,515

(22) Filed: Jan. 17, 2014

(51) Int. Cl.
*G11B 5/02* (2006.01)

(52) U.S. Cl.
USPC .................................... 360/125.31

(58) Field of Classification Search
USPC .................................... 360/125.31
See application file for complete search history.

(56) References Cited

U.S. PATENT DOCUMENTS

| | | | |
|---|---|---|---|
| 7,855,937 B2 | 12/2010 | Shimazawa et al. | |
| 8,320,220 B1 | 11/2012 | Yuan et al. | |
| 8,339,740 B2 | 12/2012 | Zou et al. | |
| 8,351,151 B2 | 1/2013 | Katine et al. | |
| 8,385,159 B2 | 2/2013 | Gao et al. | |
| 8,427,925 B2 | 4/2013 | Zhao et al. | |
| 8,553,505 B2 | 10/2013 | Rawat et al. | |
| 8,705,323 B2 * | 4/2014 | Contreras et al. | 369/13.32 |
| 8,824,086 B2 * | 9/2014 | Peng et al. | 360/59 |
| 8,842,383 B1 * | 9/2014 | Balamane et al. | 360/31 |
| 8,842,391 B2 * | 9/2014 | Zou et al. | 360/125.31 |
| 2012/0163139 A1 | 6/2012 | Vavra et al. | |
| 2013/0107679 A1 | 5/2013 | Huang et al. | |

OTHER PUBLICATIONS

Challener, W.A. et al.; "Heat-Assisted Magnetic Recording by a Near-Field Transducer with Efficient Optical Energy Transfer"; Nature Photonics; Mar. 2009, Published Online.
Bain, James A. et al.; "Near Field Optical Transducers (NFTs) for Heat Assisted Magnetic Recording"; Data Storage Systems Center (DSSC) and Sponsoring Companies; (HAMR).

* cited by examiner

*Primary Examiner* — Mark Blouin
(74) *Attorney, Agent, or Firm* — Patterson & Sheridan, LLP

(57) ABSTRACT

Embodiments of the present invention generally relate to a HAMR head including a near field transducer having an antenna, a surface diffusion inhibitor layer disposed on a portion of the antenna and an aperture disposed over the surface diffusion inhibitor layer. The surface diffusion inhibitor layer has a greater melting point than the antenna, and the surface diffusion inhibitor layer material is immiscible in the antenna material.

20 Claims, 13 Drawing Sheets

SURFACE DIFFUSION INHIBITOR FOR HAMR NFT

BACKGROUND

1. Field

Embodiments of the present invention generally relate to data storage systems, and more particularly, to write heads for thermally assisted recording.

2. Description of the Related Art

Higher storage bit densities in magnetic media used in disk drives have reduced the size (volume) of magnetic bits to the point where the magnetic bit dimensions are limited by the grain size of the magnetic material. Although grain size can be reduced further, the data stored within the cells may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the operational temperature of magnetic hard drive. Lowering the temperature may not always be practical when designing hard disk drives for commercial and consumer use. Raising the coercivity, on the other hand, will make it challenging for current write heads to do the recording.

One additional solution has been proposed, which uses magnetic media with high coercivity without the need to increase the magnetic moment of write pole material. The solution heats up a localized area on the media to a temperature above Curie temperature, thereby, lowering the effective coercivity of the localized region and thus, enabling writing with current write heads within this heated region. The data state becomes "fixed" once the media cools below Curie temperature. This technique is broadly referred to as "thermally assisted (magnetic) recording" (TAR or TAMR), "energy assisted magnetic recording" (EAMR), or "heat-assisted magnetic recording" (HAMR) which are used interchangeably herein. It can be applied to longitudinal and perpendicular recording systems as well as "bit patterned media". Heating of the media surface has been accomplished by a number of techniques such as focused laser beams or near-field optical sources.

While the laser beam or the near-field optical source is positioned to induce heating in the magnetic media, a certain percentage of heat will also be generated in the magnetic head. This heating can affect the shape of the head at the media facing surface, such as an air bearing surface (ABS), and therefore impact the fly height. Heating of the head can also impact the reliability and performance of the head because high temperatures can accelerate thermal migration of various films and structures, causing inter-diffusion and dimensional changes.

The primary areas of the HAMR head that get hot are the near-field transducer (NFT) and magnetic pole placed proximate to the NFT. The antenna material is comprised of noble metals with low melting point and hence can show morphological changes at moderate temperatures in the range of 150 to 400 degrees Celsius. Therefore, there is a need in the art for an improved recording head for HAMR.

SUMMARY OF THE INVENTION

Embodiments of the present invention generally relate to a HAMR head including a near field transducer having an antenna, a surface diffusion inhibitor layer disposed on a portion of the antenna and an aperture disposed over the surface diffusion inhibitor layer. The surface diffusion inhibitor layer has a greater melting point than the antenna, and the surface diffusion inhibitor layer material is immiscible in the antenna material.

In one embodiment, a HAMR head is disclosed. The HAMR head includes a near field transducer. The near field transducer includes an antenna having a first melting point and a surface diffusion inhibitor layer disposed on a portion of the antenna. The surface diffusion inhibitor layer has a second melting point that is greater than the first melting point. The near field transducer further includes an aperture disposed over the surface diffusion inhibitor layer.

In another embodiment, a HAMR head is disclosed. The HAMR head includes a near field transducer, where the near field transducer includes an antenna, where the antenna has a first end at a media facing surface and a second end adjacent to a waveguide core. The near field transducer further includes an aperture disposed over the antenna, a first surface diffusion inhibitor layer disposed between the antenna and the aperture, a second surface diffusion inhibitor layer disposed between the second end of the antenna and the waveguide core, and a third surface diffusion inhibitor layer disposed on the first end of the antenna at the media facing surface.

In another embodiment, a HAMR head is disclosed. The HAMR head includes a first cladding material, a waveguide core disposed on the first cladding material, a second cladding material disposed on the waveguide core, and an antenna surrounded by multiple surface diffusion inhibitor layers, where the antenna and the surface diffusion inhibitor layers are embedded in the second cladding material, and where the antenna has a tapered point at a media facing surface.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments in any field involving magnetic heads.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the present invention generally relate to a HAMR head including a near field transducer having an antenna, a surface diffusion inhibitor layer disposed on a portion of the antenna and an aperture disposed over the surface diffusion inhibitor layer. The surface diffusion inhibitor layer has a greater melting point than the antenna, and the surface diffusion inhibitor layer material is immiscible in the antenna material.

Figure 1A:
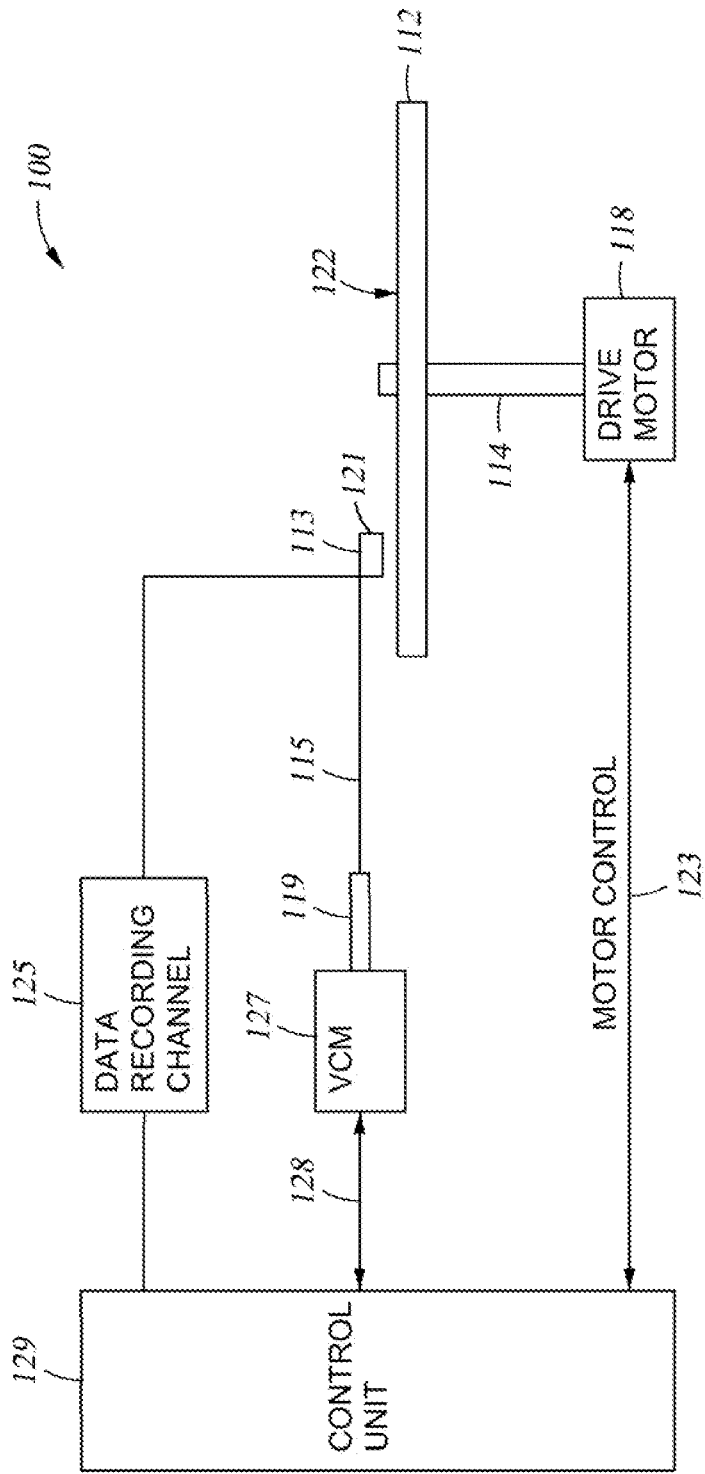
FIGS. 1A-1B illustrate a disk drive system, according to embodiments described herein.

FIG. 1A illustrates a disk drive 100 embodying this invention. As shown, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121 that may include a radiation source (e.g., a laser or electrically resistive heater) for heating the disk surface 122. As the magnetic disk rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 towards the disk surface 122. Each actuator arm 119 is attached to an actuator means 127. The actuator means 127 as shown in FIG. 1A may be a voice coil motor (VCM). The VCM comprises a coil movable within a fixed magnetic field, the direction and speed of the coil movements being controlled by the motor current signals supplied by control unit 129.

During operation of a TAR or HAMR enabled disk drive 100, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 slightly above the disk 112 surface by a small, substantially constant spacing during normal operation. The radiation source heats up the high-coercivity media so that the write elements of the magnetic head assemblies 121 may correctly magnetize the data bits in the media.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1A are for representation purposes only. It should be apparent that disk storage systems may contain a large number of disks and actuators, and each actuator may support a number of sliders.

Figure 1B:
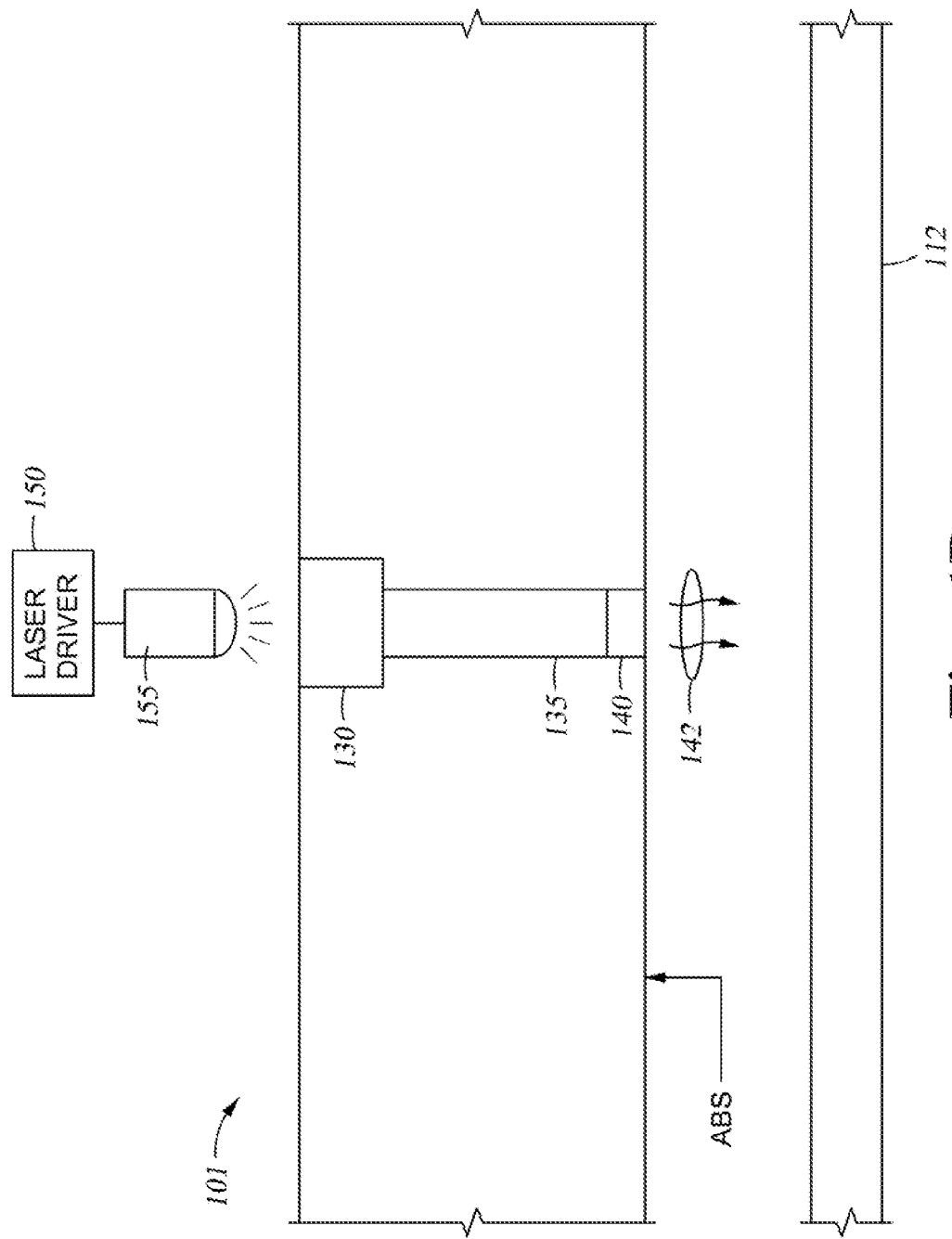

FIG. 1B is a cross sectional schematic of a HAMR enabled write head 101, according to one embodiment described herein. The head 101 is operatively attached to a laser 155 (i.e., a radiation source) that is powered by a laser driver 150. The laser 155 may be placed directly on the head 101 or radiation may be delivered from a laser 155 located separate from the slider through an optical fiber or waveguide. Similarly, the laser driver 150 circuitry may be located on the slider 113 or on a system-on-chip (SOC) associated with the disk drive 100 such as the control unit 129 as shown in FIG. 1A. The head 101 includes a spot-size converter 130 for focusing the radiation transmitted by the laser 155 into the waveguide 135. In another embodiment, the head 101 may include one or more lens for focusing the beamspot of the laser 155 before the emitted radiation reaches the spot-size converter 130. The waveguide 135 is a channel that transmits the radiation through the height of the head 101 to a NFT 140—e.g., a plasmonic device or optical transducer—which is located at or near a media facing surface, such as an air-bearing surface (ABS). The NFT 140 further focuses the beamspot to avoid heating neighboring tracks of data on the disk 112—i.e., creates a beamspot much smaller than the diffraction limit. As shown by arrows 142, this optical energy emits from the NFT 140 to the surface of the disk 112 below the ABS of the head 101. The embodiments herein, however, are not limited to any particular type of radiation source or technique for transferring the energy emitted from the radiation source to the ABS.

Figure 2:
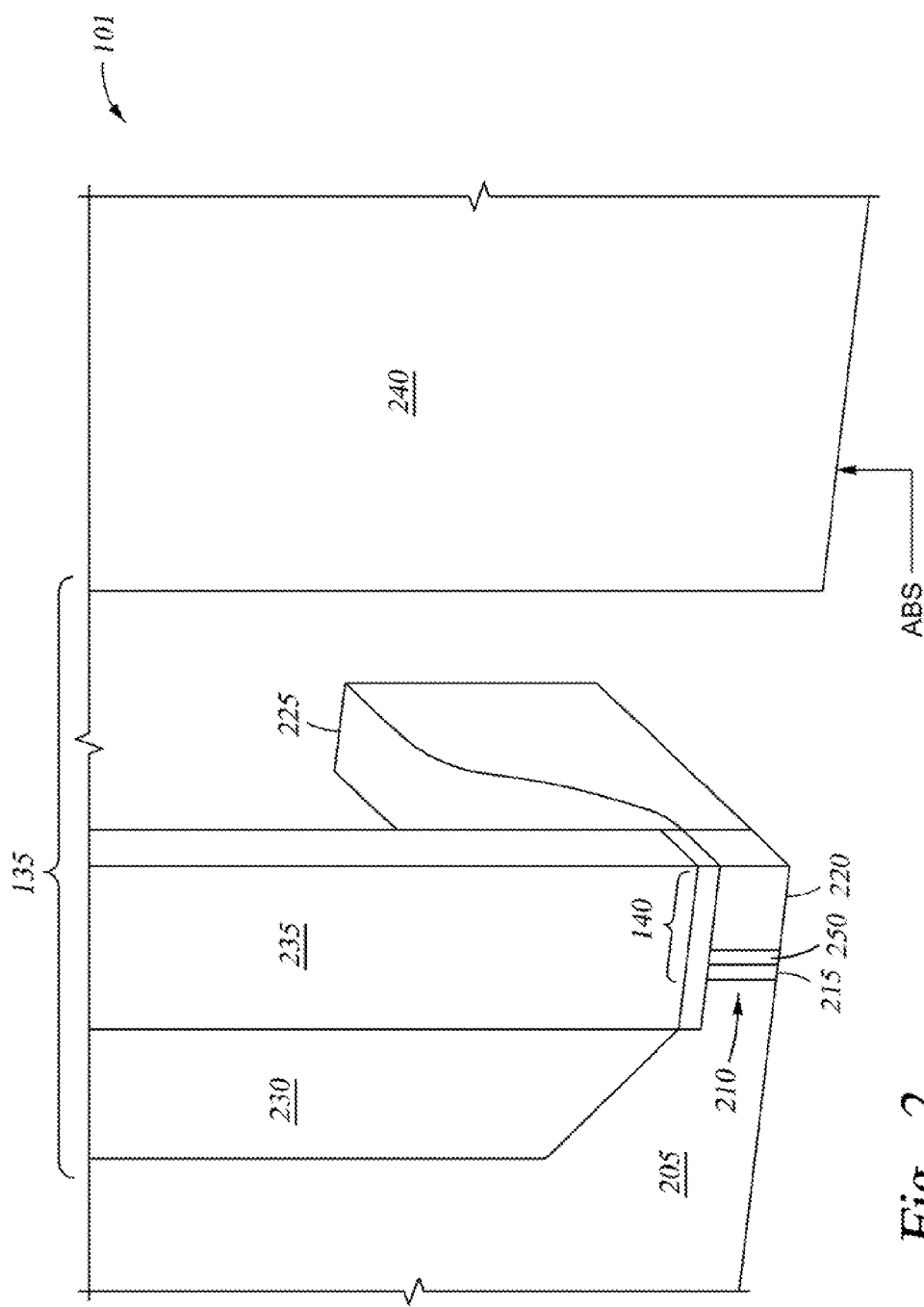
FIG. 2 illustrates a cross-sectional schematic diagram of a HAMR enabled head, according to one embodiment described herein.

FIG. 2 illustrates a cross-sectional schematic diagram of the HAMR enabled head 101, according to one embodiment of the invention. As shown, this portion of the head 101 includes the waveguide 135, which consists of waveguide core 235 and waveguide cladding 230, but with some of the cladding 230 (and any cladding on the back-side of the head 101) removed to better illustrate the details of heat sink 225. The NFT 140 may be directly or thermally coupled to the heat sink 225 for removing excess heat from the NFT 140. Because FIG. 2 is a cross-section of head 101, there may be another heat sink located opposite the heat sink 225 depicted. The return pole 240 is located between the NFT 140 and shield layers or the read pole which are not shown in this figure.

In one embodiment, the write pole 205 includes a magnetic lip 210 portion that may extend underneath the core 235 of the waveguide 135. The placement of magnetic lip 210 close to the NFT 140 aids in bringing magnetic flux close to the optical field generated by the NFT onto the magnetic media.

The core 235 (and the waveguide 135) may terminate at the NFT 140. The NFT 140 at least includes an antenna 220 and an aperture 215. The antenna 220 has a base layer and a notch (described in detail below). In some embodiments, because the design and/or material of the pole lip 210 may improve the efficiency of the antenna 220, the pole lip 210 may be considered as part of the NFT 140. The antenna 220 may be Au, Cu, Ag, Al or alloys comprising these elements. The aperture 215 is an opening that may be filled with low refractive index and optically transparent material such as, for example, $SiO_2$ or other dielectric material. The aperture 215 may refer to the material that is filling the opening. In one embodiment, the aperture 215 may comprise of the same material as the cladding 230. The write pole 205 and pole lip 210 may comprise of Ni, Co, Fe, Cr, or some combination or alloy thereof. The NFT 140 uses the antenna 220 and aperture 215 to further focus the optical energy delivered by the waveguide 135 onto the magnetic media.

The heat generated in the NFT 140 may be cause the temperature of the NFT 140 to rise beyond 400 degrees Celsius. The antenna 220 typically comprised of materials that have melting temperatures in the range of 950 to 1070 degrees Celsius. However, once the temperature reaches 150 degrees Celsius, the surface diffusion of atoms of the antenna 220 increases, leading to morphological changes in the antenna 220 such as rounding off of the edges of the antenna 220 or the notch of the antenna 220 to disappear. An antenna with damaged or absent notch will cause drastic reduction in optical efficiency of the NFT since the notch is a focal point for the NFT. To avoid this issue, a surface diffusion inhibitor layer 250 is disposed between the antenna 220 and the aperture 215. The surface diffusion inhibitor layer 250 is made of a material that has a higher melting temperature than the antenna 220, such as Rh, Ru, W, Mo, Ir, Co, Pt, B or Ni and is immiscible with the antenna 220. In one embodiment, the surface diffusion inhibitor layer 250 is made of an Au alloy of Rh, Ru, W, Mo, Ir, Co, Pt, B or Ni. The surface diffusion inhibitor layer 250 has a thickness of less than 10 nm and has a melting temperature that is higher than 1100 degrees Celsius. Having the surface diffusion inhibitor layer 250 will ensure morphological stability of the NFT 140 at operational temperatures, such as up to 400 degrees Celsius.

Figure 3A:
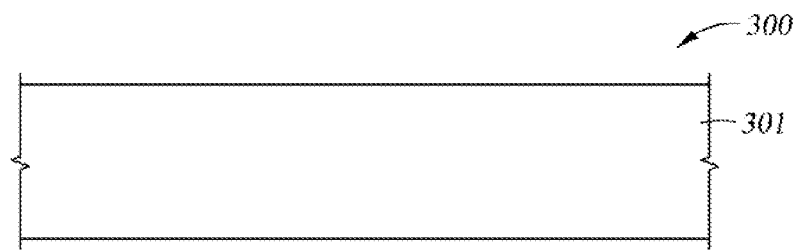
FIGS. 3A-3J are ABS views of a magnetic head at different processing stages according to one embodiment of the invention.
Figure 3B:
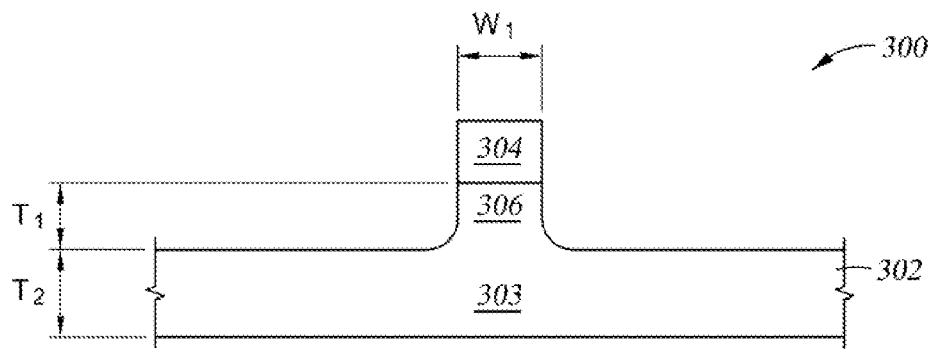
Figure 3C:
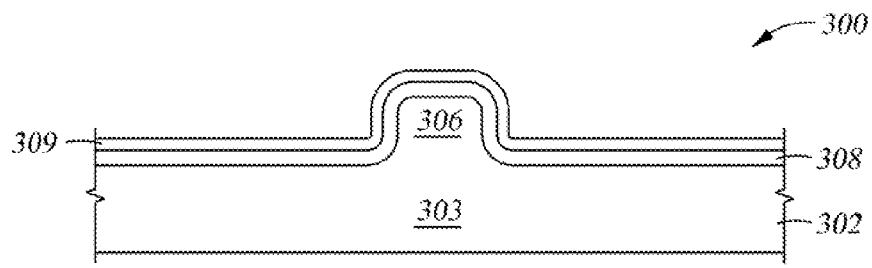
Figure 3D:
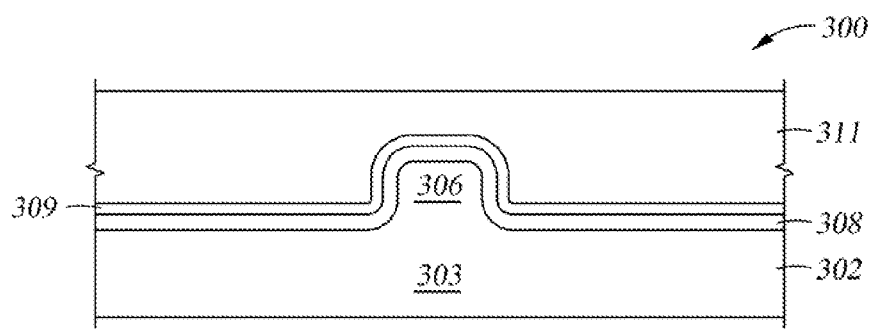

FIGS. 3A-3J are ABS views of a magnetic head 300 at different processing stages according to one embodiment of the invention. FIG. 3A shows a layer 301 that is made of Au. The thickness of layer 301 is between about 100 nm to about 200 nanometers (nm) and is deposited on a substrate that has a partially formed HAMR head disposed thereon. As shown in FIG. 3B, a mask 304 is disposed on a portion of the layer 301, and portions of the layer 301 not covered by the mask 304 are removed, forming an antenna 302. The removal process may be ion milling or reactive ion etching (RIE). The antenna 302 may be the antenna 220 in FIG. 2. The antenna 302 has a base layer 303 and a notch 306, which serves as a focal point for the NFT 140. The notch 306 has a thickness "T1" of about 50 nm and the base layer 303 has a thickness "T2" of about 150 nm. The width "W1" of the notch 306 is between 10 nm and 50 nm. Next, as shown in FIG. 3C, the mask 304 is removed and a surface diffusion inhibitor layer 308 is deposited on the antenna 302. The surface diffusion inhibitor layer 308 may be the surface diffusion inhibitor layer 250 in FIG. 2. An adhesion layer 309 may be deposited on the surface diffusion inhibitor layer 308. The adhesion layer 309 may have a thickness of less than about 5 nm and may be made of a material such as Ti, Ta, Cr, Zr, Hf, Si or alloys thereof, such as NiTi, NiTa, NiCr, NiZr, or NiHf. Both layers 308, 309 may be deposited by physical vapor deposition (PVD), ion beam deposition (IBD), atomic layer deposition (ALD), or plasma enhanced chemical vapor deposition (PECVD). A dielectric layer 311 is deposited over the surface diffusion inhibitor layer 308, as shown in FIG. 3D. The dielectric layer 311 may be deposited on the surface diffusion inhibitor layer 308. The dielectric layer 311 may be $SiO_2$. In one embodiment, the adhesion layer 309 is deposited in-situ prior to deposition of dielectric layer 311.

Figure 3E:
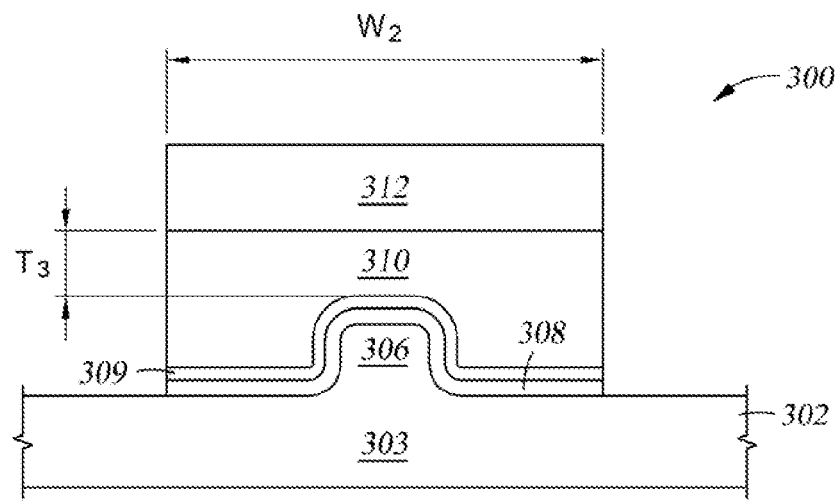

A mask 312 is deposited on a portion of the dielectric layer 311, and portions of the dielectric layer 311 and the surface diffusion inhibitor layer 308 not covered by the mask 312 are removed. The removal process may be ion milling and/or reactive ion etching (RIE). As a result, an aperture 310 is formed, as shown in FIG. 3E. The aperture 310 may be the aperture 215 in FIG. 2. The aperture 310 may have a thickness "T3" of about 50 nm and a width "W2" of about 300 nm. The notch 306 may be centrally located within the aperture 310.

Figure 3F:
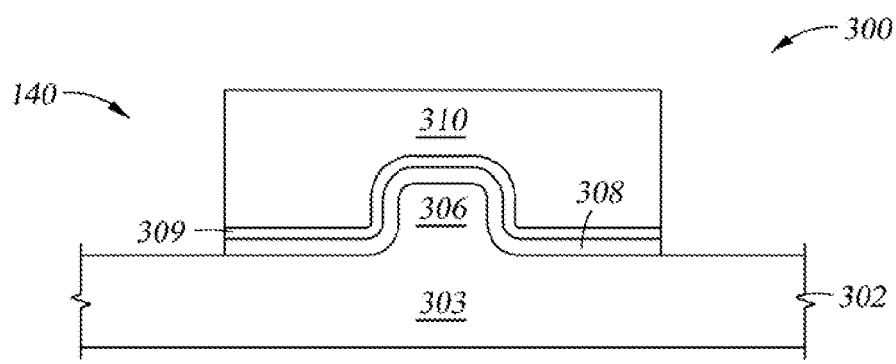

Next, as shown in FIG. 3F, the mask 312 is removed, leaving the antenna 302, the aperture 310 and the diffusion inhibitor layer 308, which forms the NFT 140. The antenna 302 and the aperture 310 may have various shapes. In one embodiment, the antenna 302 may have a shape that looks like the letter "E" rotated 90 degrees in counter clockwise direction. The aperture 310 is disposed over the antenna 302 and may have a shape that looks like the letter "C" rotated 90 degrees in the clockwise direction.

Figure 3G:
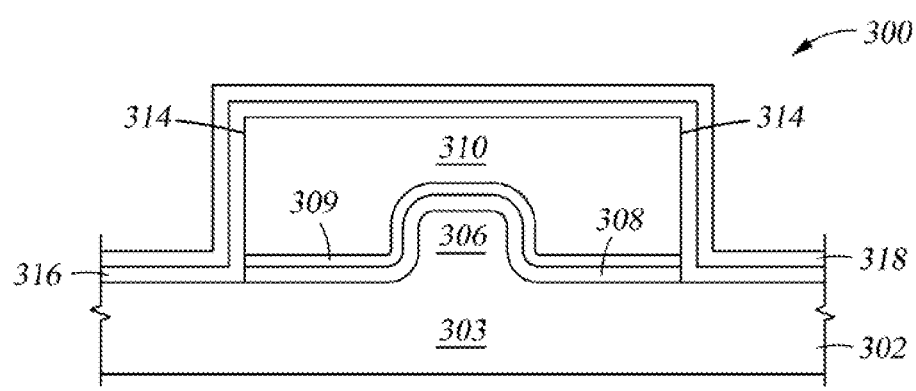

Next, as shown in FIG. 3G, a conductive layer 318 is deposited over the antenna 302 and the aperture 310. The conductive layer 318 may also cover the exposed vertical sides 314 of the aperture 310. The conductive layer 318 may have good thermal conductivity and may be made of a noble metal, such as Au, Rh, Ru, Ir, Pd, Pt, Re, or Os. The conductive layer 318 may also be an alloy having over 95% of one of the noble metals, such as Au, Rh, Ru, Ir, Pd, Pt, Re, or Os as described in U.S. patent application Ser. No. 14/133,003 filed Dec. 18, 2013, which is incorporated herein by reference. The thickness of the conductive layer 318 may be less than or equal to 10 nm. In one embodiment, the thickness of the conductive layer 318 is about 5 nm. The conductive layer 318 may be formed using any suitable deposition process, such as sputtering.

The conductive layer 318 may not have good adhesion to the aperture 310, thus, a seed layer 316 may be first deposited over the antenna 302 and the aperture 310, and the conductive layer 318 is then deposited on the seed layer 316. The seed layer 316 may be any suitable material, such as Ta, NiTa, Cr, Ti, Si or alloys thereof, such as NiTi, NiTa, NiCr, NiZr, or NiHf. In one embodiment, the seed layer 316 is about 1 nm thick.

Figure 3H:
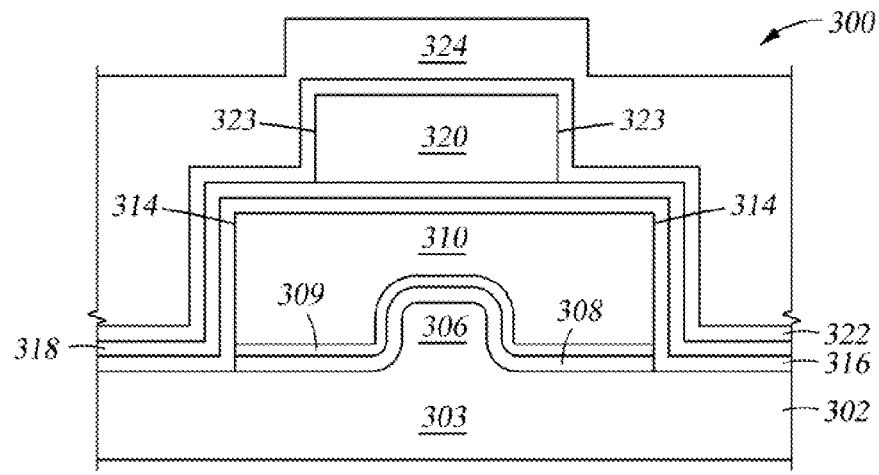

Next, as shown in FIG. 3H, a resist 320 is deposited over the conductive layer 318 and a second conductive layer 322 is deposited over the conductive layer 318 and the resist 320. The resist 320 may be deposited and patterned using any suitable processes. The second conductive layer 322 may also cover vertical sides 323 of the resist 320. The second conductive layer 322 may also have good thermal conductivity and may be made of a noble metal, such as Au, Rh, Ru, Ir, Pd, Pt, Re, or Os. The second conductive layer 322 may also be an alloy having over 95% of one of the noble metals, such as Au, Rh, Ru, Ir, Pd, Pt, Re, or Os. Any suitable deposition process may be used to deposit the second conductive layer 322, and one example of such process is sputtering. The second conductive layer 322 may have a thickness of less than or equal to 100 nm.

In one embodiment, the second conductive layer 322 comprises the same material as the conductive layer 318. In another embodiment, the second conductive layer 322 comprises a different material as the conductive layer 318. A second seed layer (not shown) may be optionally deposited over the conductive layer 318 and the resist 320, and the second conductive layer 322 is deposited on the second seed layer. Next, a heat sink 324 is deposited over the second conductive layer 322. The heat sink 324 is made of a material having good thermal conductivity, such as Cr, Au, Ir, Pt, Pd, Ru, or Rh, and is deposited using any suitable deposition process, such as physical vapor deposition (PVD).

Figure 3I:
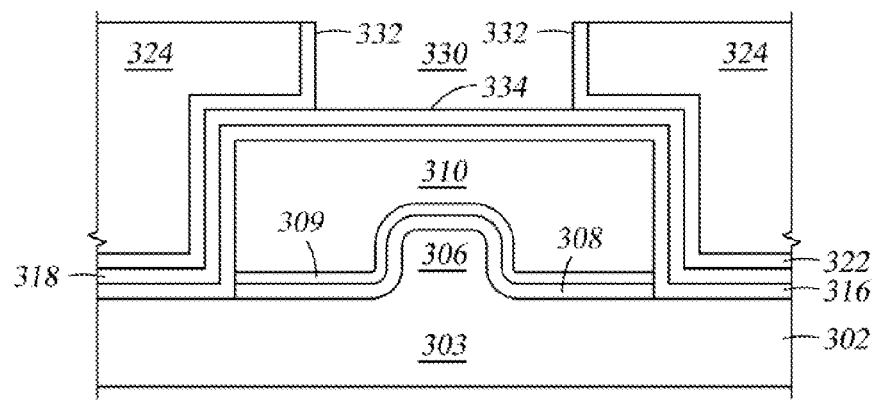

One or more removal processes are performed to form an opening 330, as shown in FIG. 3I. The removal process will include a combination of subtractive processes such as resist wet strip, ion milling and reactive ion etch. The opening 330 has vertical sides 332 and a bottom 334. The vertical sides 332 are the second conductive layer 322 and the bottom 334 is the conductive layer 318. Because both conductive layers 318, 322 may be a noble metal or an alloy of a noble metal, no oxidation may occur at the vertical sides 332 and the bottom 334 of the opening 330. Therefore, no oxide films may be formed on the vertical sides 332 and the bottom 334 of the opening 330 as the magnetic head 300 at the current processing stage is exposed to oxygen.

Figure 3J:
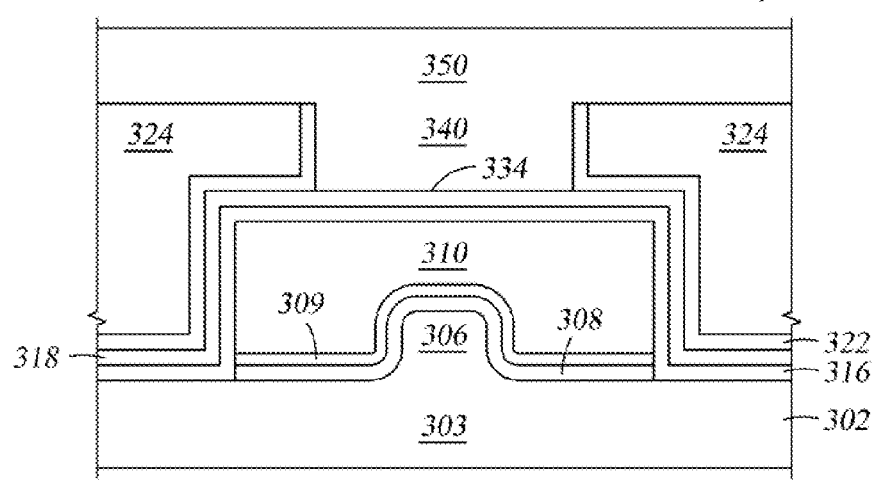

A magnetic material is deposited in the opening 330 and over the heat sink 324, as shown in FIG. 3J. The portion of the magnetic material that is in the opening 330 is the pole lip 340 and the portion of the magnetic material that is over the heat sink 324 and the pole lip 340 is the write pole 350. The pole lip 340 and the write pole 350 may be the pole lip 210 and the write pole 205 in FIG. 2. The resulting magnetic head 300 as shown in FIG. 3J has the surface diffusion inhibitor layer 308 disposed on the antenna 302, and the surface diffusion inhibitor layer 308 inhibits the atoms of the antenna 302 from diffusing, which ensures morphological stability of the NFT 140 at operational temperatures.

Figure 4A:
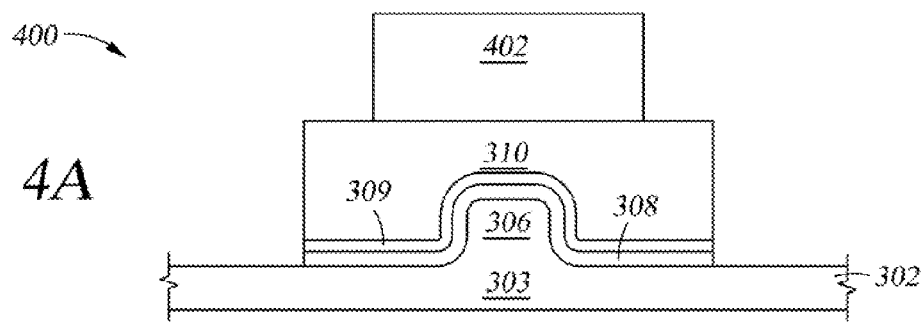
FIGS. 4A-4D are ABS views of a magnetic head at different processing stages according to one embodiment of the invention.
Figure 4B:
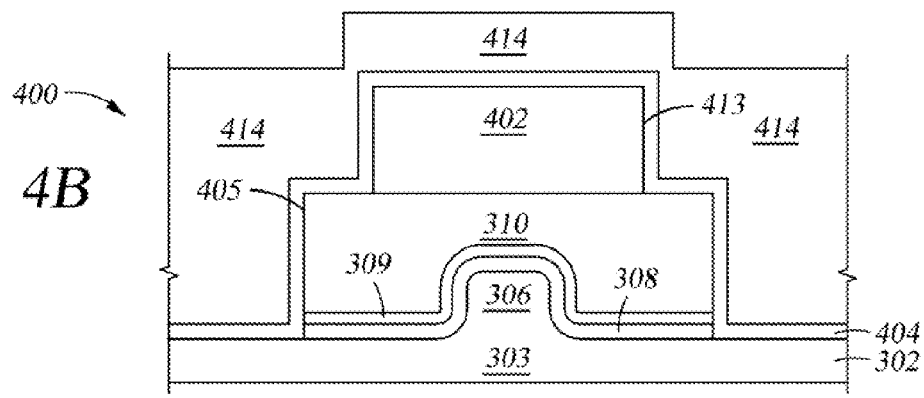

FIGS. 4A-4D are ABS views of a magnetic head 400 at different processing stages according to one embodiment of the invention. FIG. 4A shows the antenna 302, the surface diffusion inhibitor layer 308, the adhesion layer 309, the aperture 310, and a resist 402 coated and lithographically patterned over the aperture 310. Again the resist 402 may be deposited and patterned using any suitable process. Next, as shown in FIG. 4B, a conductive layer 404 is deposited over the antenna 302, a portion of the aperture 310 that is not covered by the resist 402, and the resist 402. Vertical sides 413 of the resist 402 and vertical sides 405 of the aperture 310 are also covered by the conductive layer 404.

The conductive layer 404 may be deposited using any deposition process, such as PVD or ALD and may have a thickness of less than or equal to 100 nm. The conductive layer 404 may be a noble metal, such as Au, Rh, Ru, Ir, Pd, Pt, Re, or Os. The conductive layer 404 may also be an alloy having over 95% of one of the noble metals, such as Au, Rh, Ru, Ir, Pd, Pt, Re, or Os.

Prior to depositing the conductive layer 404, an optional seed layer (not shown) may be deposited over the antenna 302, a portion of the aperture 310 that is not covered by the resist 402, and the resist 402. The conductive layer 404 is then deposited over the seed layer. A heat sink 414 is deposited over the conductive layer 404. The heat sink 414 is made of a material having good thermal conductivity, such as Cr, Au, Ir, Pt, Pd, Ru, or Rh, and is deposited using any suitable deposition process, such as physical vapor deposition (PVD).

Figure 4C:
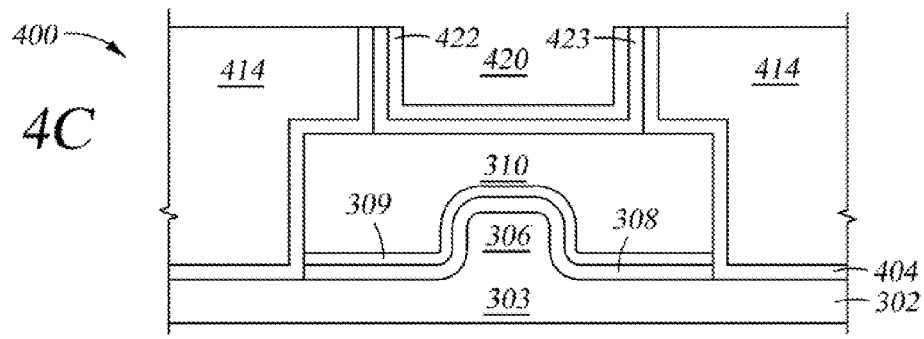
Figure 4D:
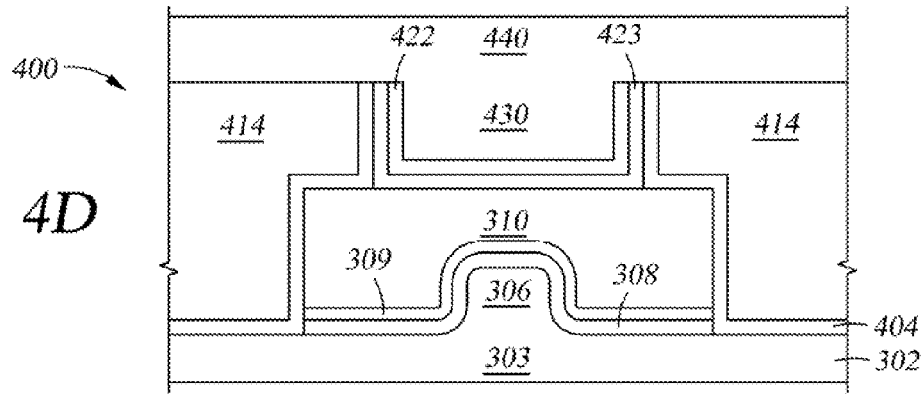

Next, one or more removal processes are performed to form an opening 420, as shown in FIG. 4C. The removal process will include a combination of subtractive processes such as resist wet strip, ion milling and reactive ion etch. A second conductive layer 422 is then deposited into the opening 420, covering the vertical sides and the bottom of the opening 420.

The second conductive layer 422 may also have good thermal conductivity and may be made of a noble metal, such as Au, Rh, Ru, Ir, Pd, Pt, Re, or Os. The second conductive layer 422 may also be an alloy having over 95% of one of the noble metals, such as Au, Rh, Ru, Ir, Pd, Pt, Re, or Os. Any suitable deposition process may be used to deposit the second conductive layer 422. One example of such process is ALD. The second conductive layer 422 may have a thickness of less than or equal to 10 nm. In one embodiment, the thickness of the second conductive layer is about 5 nm.

A seed layer 423 may be first deposited into the opening 420, and then the second conductive layer 422 is deposited on the seed layer 423. The seed layer 423 may be any suitable material, such as Ta, NiTa, Cr, Ti or Si. In one embodiment, the seed layer 423 is about 1 nm thick. The conductive layer 404 and the second conductive layer 422 may be the same material or may be different materials. The magnetic head 400 at the current processing stage may not have oxide films formed in the opening 420 since the sides and the bottom of the opening 420 are covered by the second conductive layer 422, which may be a noble metal that would not react with oxygen.

A magnetic material is deposited in the opening 420 and over the heat sink 414. The portion of the magnetic material that is in the opening 420 is the pole lip 430 and the portion of the magnetic material that is over the heat sink 420 and the pole lip 430 is the write pole 440. The pole lip 430 and the write pole 440 may be the pole lip 210 and the write pole 205 in FIG. 2.

Figure 5A:
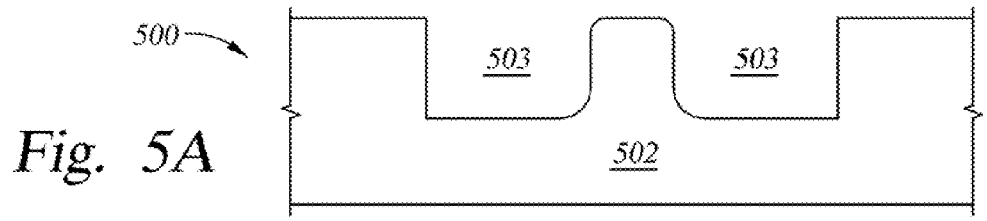
FIGS. 5A-5H are ABS views of a magnetic head at different processing stages according to one embodiment of the invention.
Figure 5B:
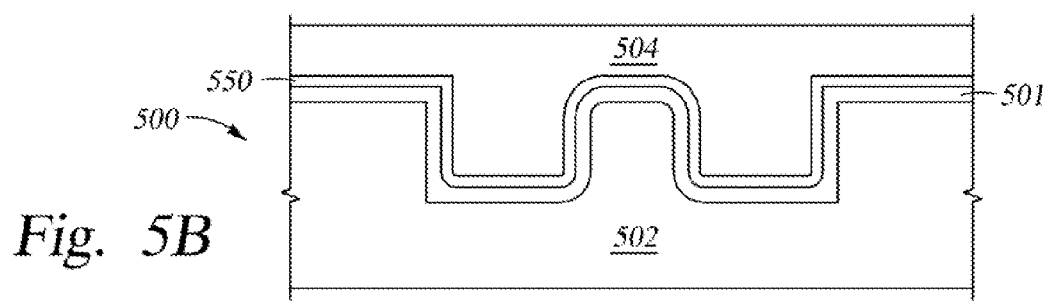
Figure 5C:
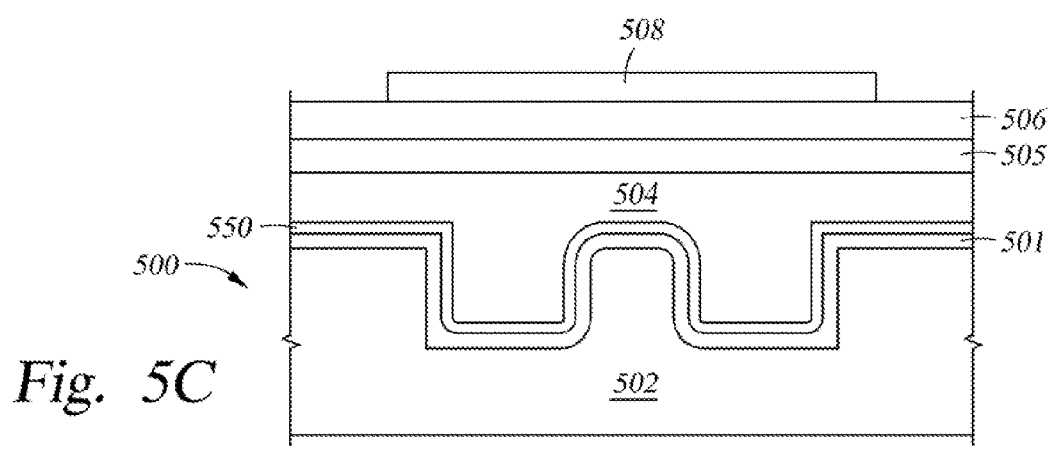

FIGS. 5A-5H are ABS views of a magnetic head 500 at different processing stages according to one embodiment of the invention. FIG. 5A shows an "E" shaped antenna 502 having openings 503 formed therein. The antenna 502 may be the antenna 220 in FIG. 2. A Surface diffusion inhibitor layer 501 is deposited on the antenna 502, as shown in FIG. 5B. The surface diffusion inhibitor layer 501 may be the surface diffusion inhibitor layer 308 in FIGS. 3 and 4. An adhesion layer 550 is deposited on the surface diffusion inhibitor layer 501 and the adhesion layer 550 may be the adhesion layer 309 in FIGS. 3 and 4. A "C" shaped aperture 504 is deposited over the surface diffusion inhibitor layer 501 and over the antenna 502, and planarized as shown in FIG. 5B. Next, as shown in FIG. 5C, a seed layer 505 is deposited over the aperture 504. The seed layer 505 may be any suitable material, such as Ta, NiTa, Cr, Ti or Si and has a thickness of about 1 nm.

A conductive layer 506 is deposited on the seed layer 505. The conductive layer 506 may be deposited using any deposition process, such as ALD and may have a thickness of less than or equal to 10 nm. In one embodiment, the thickness of the conductive layer 506 is about 2 nm. The conductive layer 506 may be a noble metal, such as Au, Rh, Ru, Ir, Pd, Pt, Re, or Os. The conductive layer 506 may also be an alloy having over 95% of one of the noble metals, such as Au, Rh, Ru, Ir, Pd, Pt, Re, or Os.

Figure 5D:
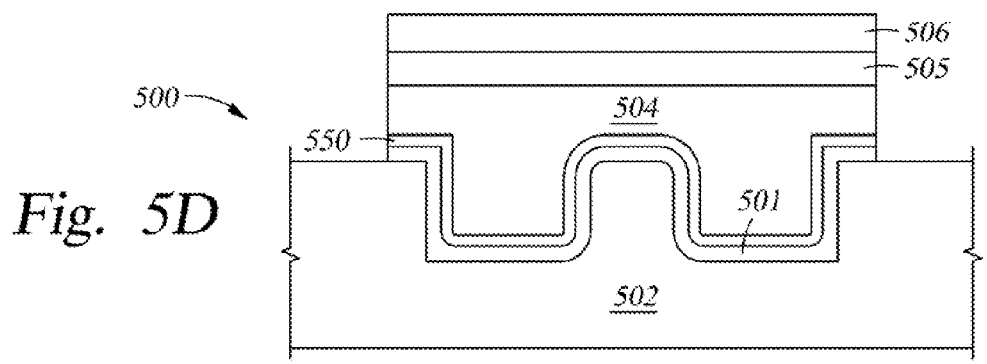

A mask 508 is deposited over the conductive layer 506 and covers a portion of the conductive layer 506. One or more removal processes are performed to remove portions of the conductive layer 506, the aperture 504, the adhesion layer 550 and the surface diffusion inhibitor layer 501 not covered by the mask 508. The removal processes may be multiple ion milling processes, multiple reactive ion etching (RIE) processes, or a combination of ion milling and RIE processes. The mask 508 is also removed as the result of the one or more removal processes. The resulting structure, as shown in FIG. 5D, has the aperture 504 exposing portions of vertical sides above the antenna 502, and the seed layer 505 and the conductive layer 506 are disposed over the aperture 504. The aperture 504 may be the aperture 215 in FIG. 2.

Figure 5E:
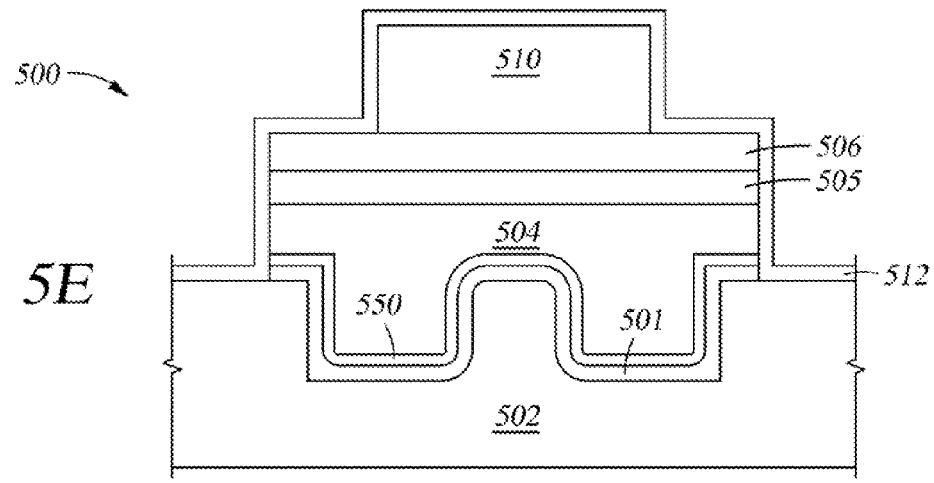

Next, as shown in FIG. 5E, a resist 510 is deposited over the conductive layer 506 and covers a portion of the conductive layer 506. A second conductive layer 512 is deposited over the antenna 502, the conductive layer 506 not covered by the resist 510, and the resist 510. The vertical sides of the resist 510, conductive layer 506, seed layer 505, and aperture 504 are also covered by the second conductive layer 512. The second conductive layer 512 may be deposited using any deposition process, such as ALD and may have a thickness of less than or equal to 100 nm. The second conductive layer 512 may be a noble metal, such as Au, Rh, Ru, Ir, Pd, Pt, Re, or Os. The second conductive layer 512 may also be an alloy having over 95% of one of the noble metals, such as Au, Rh, Ru, Ir, Pd, Pt, Re, or Os.

Figure 5F:
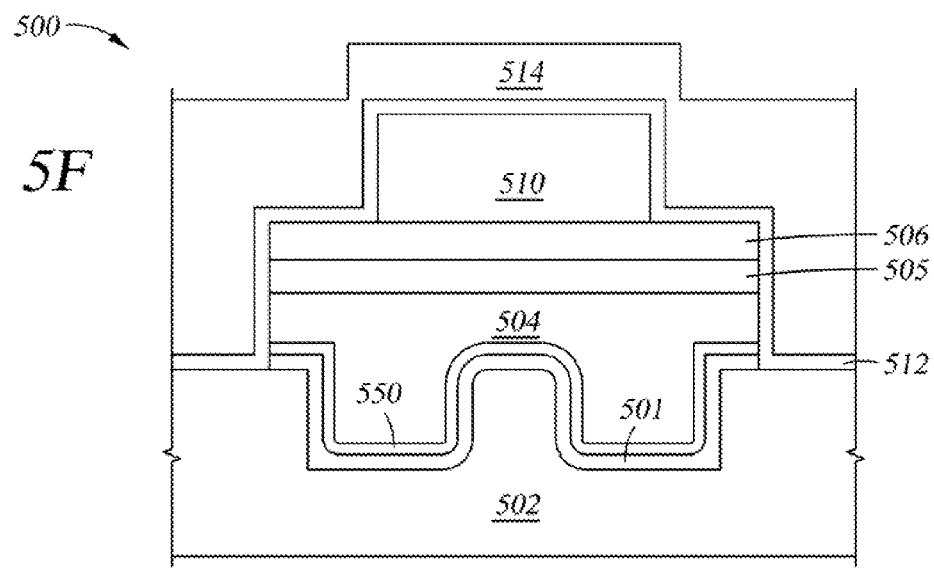

A heat sink 514 is deposited over the second conductive layer 512, as shown in FIG. 5F. The heat sink 514 is made of a material having good thermal conductivity, such as Cr, Ir, Pt, Pd, Ru, or Rh, and is deposited using any suitable deposition process, such as physical vapor deposition (PVD).

Figure 5G:
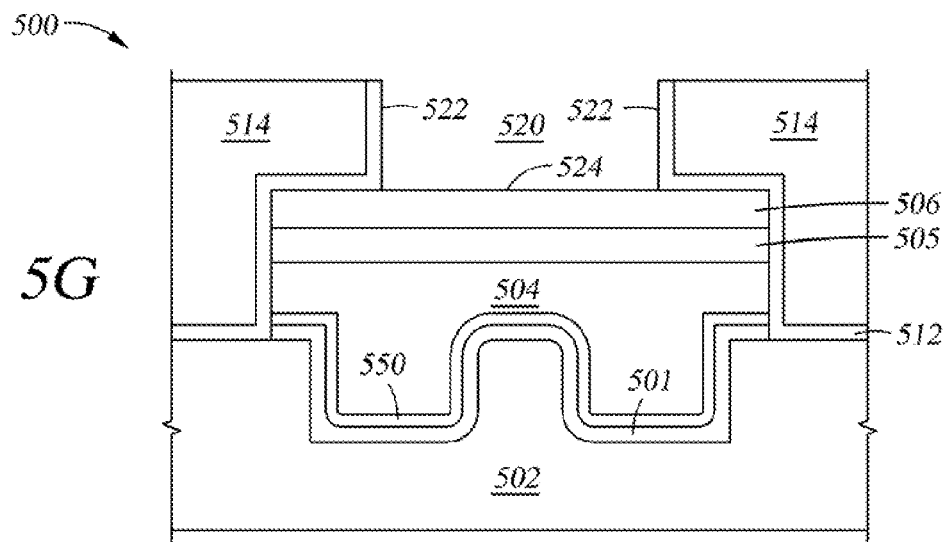

Next, one or more removal processes are performed to form an opening 520, as shown in FIG. 5G. The removal process will include a combination of subtractive processes such as resist wet strip, ion milling and reactive ion etch. Portions of the heat sink 514 and the second conductive layer 512 covering the top surface of the resist 510 are first removed to expose the top surface of the resist 510 by any suitable removal process, such as ion milling. Then the resist 510 is removed by any suitable removal process, such as wet stripping, to form the opening 520.

The opening 520 has vertical sides 522 and a bottom 524. The vertical sides 522 are the second conductive layer 512 and the bottom 524 is the conductive layer 506. Because both conductive layers 506, 512 may be a noble metal or an alloy of a noble metal, no oxidation may occur at the vertical sides 522 and the bottom 524 of the opening 520. Therefore, no oxide films may be formed on the vertical sides 522 and the bottom 524 of the opening 520 as the magnetic head 500 at the current processing stage is exposed to oxygen.

Figure 5H:
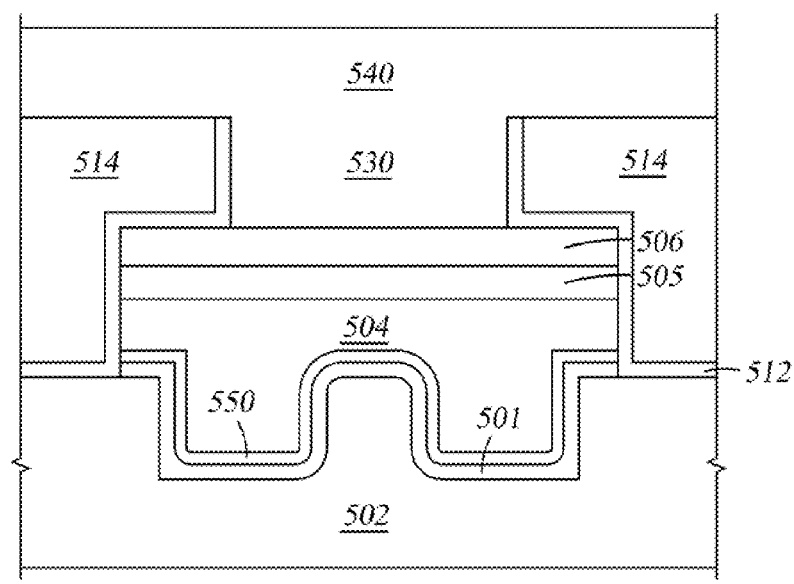

A magnetic material is deposited in the opening 520 and over the heat sink 514, as shown in FIG. 5H. The portion of the magnetic material that is in the opening 520 is the pole lip 530 and the portion of the magnetic material that is over the heat sink 514 and the pole lip 530 is the write pole 540. The pole lip 530 and the write pole 540 may be the pole lip 210 and the write pole 205 in FIG. 2.

Figure 6A:
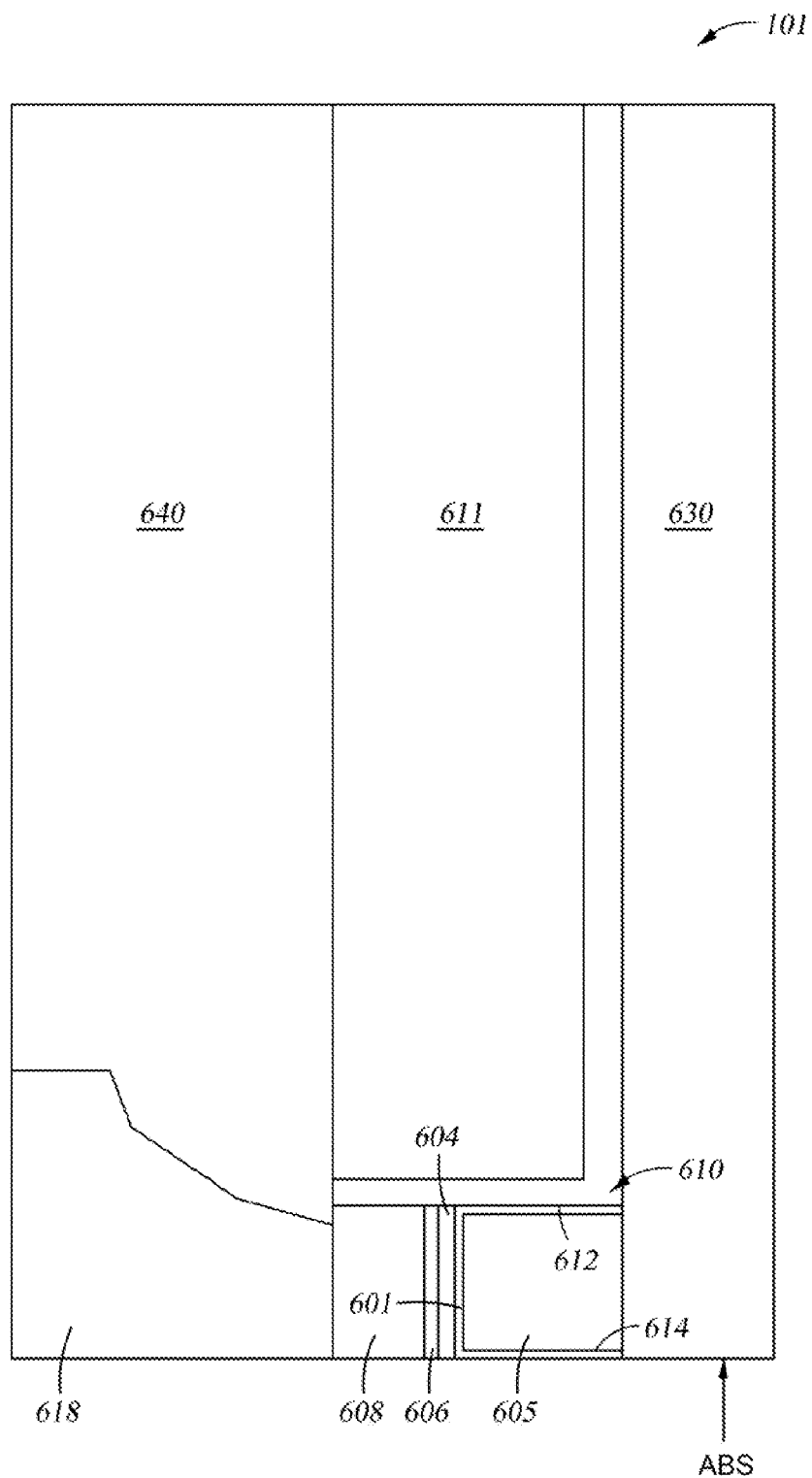
FIGS. 6A-6B are cross-sectional schematic diagrams of a HAMR enabled head, according to embodiments of the invention.
Figure 6B:
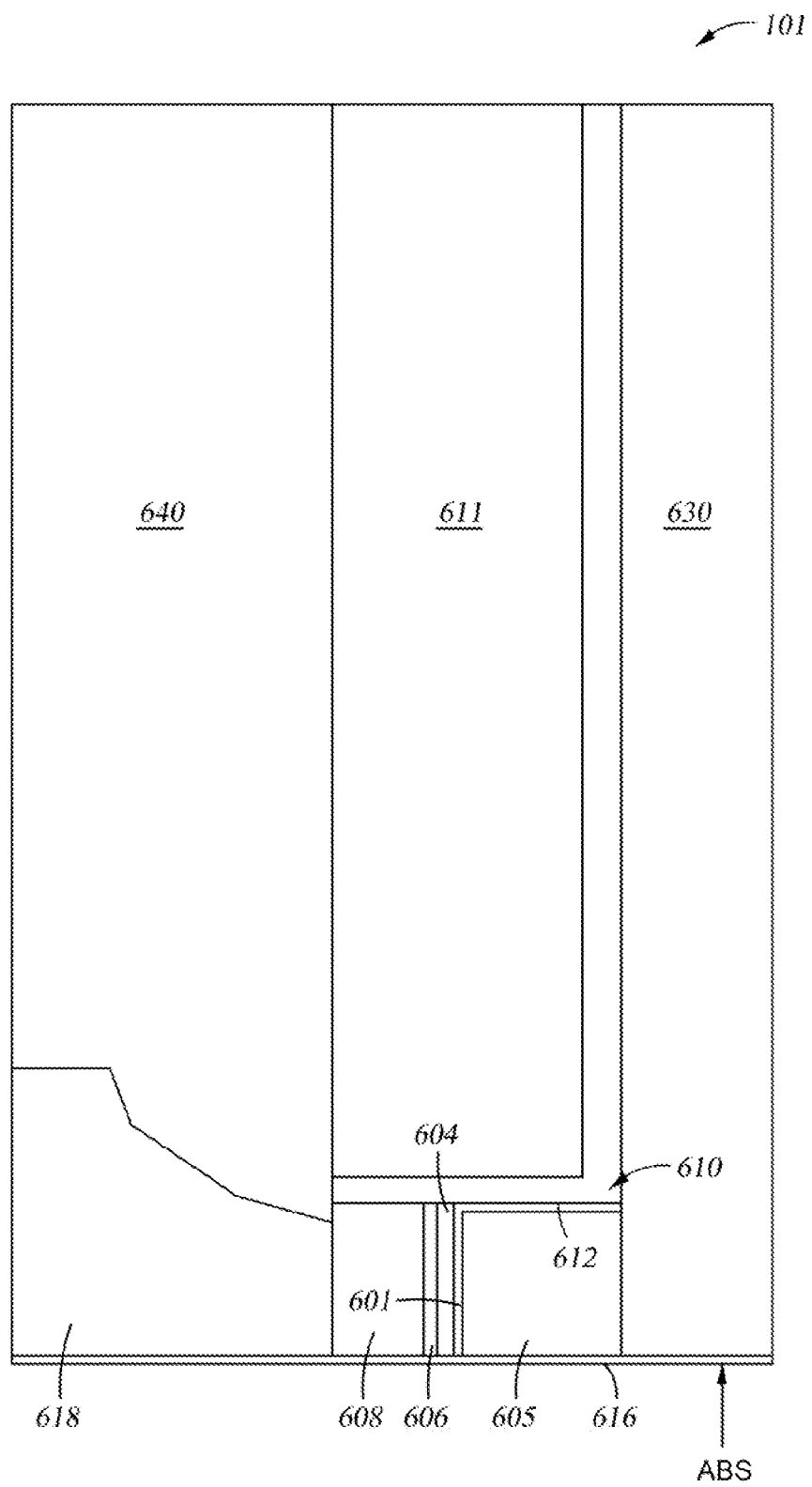

FIGS. 2, 3, 4 and 5 illustrate a surface diffusion inhibitor layer disposed between the antenna and the aperture. However, the surface diffusion inhibitor layer may not be limited to the location between the antenna and the aperture to help prevent surface diffusion of atoms of the antenna. FIGS. 6A and 6B are cross-sectional views of the HAMR enabled head 101 that illustrates multiple locations for the surface diffusion inhibitor layer.

As shown in FIG. 6A, the surface diffusion inhibitor layer 601 may be disposed between the antenna 605 and the aperture 604. A conductive layer 606 is disposed between the aperture 604 and the magnetic lip 608. A dielectric underlayer material 610 is disposed over the magnetic lip 608, the conductive layer 606, the aperture 604, the surface diffusion inhibitor layer 601, and the antenna 605. A waveguide core 611 is disposed over the dielectric underlayer material 610, a top cladding 640 is disposed adjacent the waveguide core 611 and a bottom cladding 630 is disposed adjacent the dielectric underlayer material 610 and the antenna 605. A second surface diffusion inhibitor layer 612 may be disposed between the antenna 605 and the dielectric material 610. A third surface diffusion inhibitor layer 614 may be disposed between the antenna 605 and the ABS.

FIG. 6B shows surface diffusion inhibitor layers 601 and 612, and instead of the surface diffusion inhibitor layer 614, a surface diffusion inhibitor layer 616 may be disposed at the ABS, covering not only the antenna 605, but also the aperture 604, the conductive layer 606, the magnetic lip 608, the main pole 618 and the bottom cladding 630. The surface diffusion inhibitor layers 601, 612, 614 and 616 may be the surface diffusion inhibitor layer 308, which is utilized to prevent surface diffusion of atoms of the antenna 605.

Figure 7:
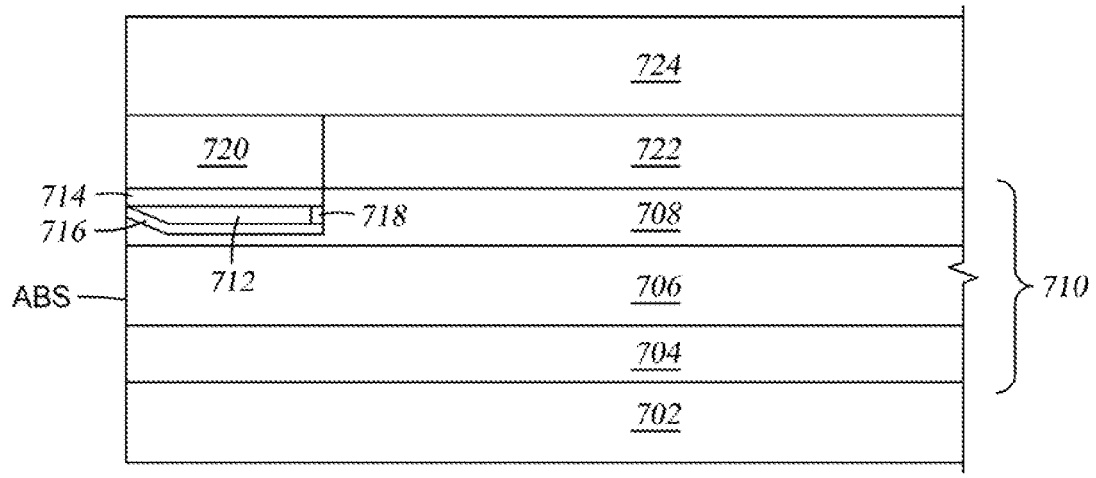
FIG. 7 is a cross-sectional schematic diagram of a HAMR enabled head, according to one embodiment of the invention.
Figure 8:
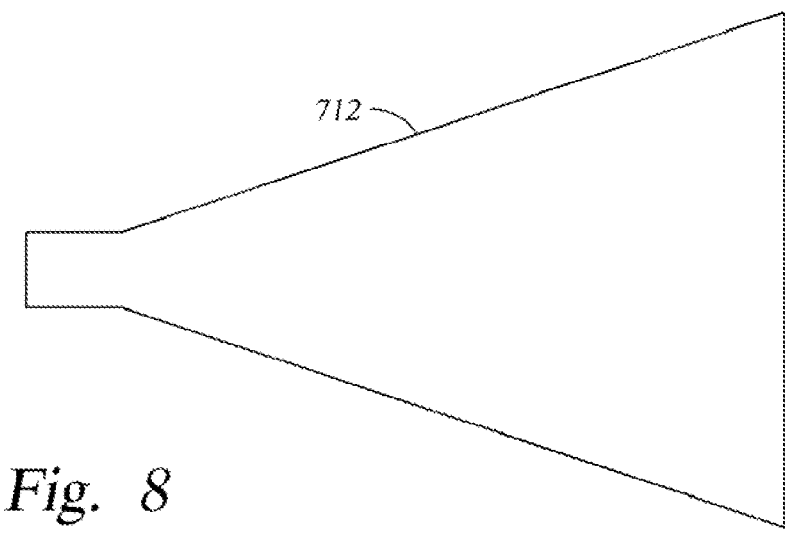
FIG. 8 is a top view of an antenna shown in FIG. 7, according to one embodiment of the invention.

The antenna may have a shape other than that discussed above. For example, the antenna could be a nano-beak design having a shape similar to a bird's beak, narrowing to a point at the ABS. FIGS. 7 and 8 illustrate such an embodiment where the antenna is a nano-beak antenna 712. A cladding material 704 is disposed on a substrate 702, which may have components of a HAMR head disposed thereon. A waveguide core 706 is disposed on the cladding material 704 and a cladding material 708 is disposed on the waveguide core 706. The cladding materials 704, 708 and the waveguide core 706 form the waveguide 710. The nano-beak antenna 712 is surrounded by surface diffusion inhibitor layers 714, 716 and 718, and is embedded in the cladding material 708. The surface diffusion inhibitor layers 714, 716 and 718 may be the surface diffusion inhibitor layer 308. The magnetic lip 720 is disposed over the antenna 712 and adjacent a non-magnetic spacer layer 22. Disposed on the magnetic lip 720 and the non-magnetic spacer layer 722 may be an upper return pole 724. FIG. 8 is a top view of the nano-beak antenna 712, where it can be seen that the antenna 712 also narrows to a point at the ABS as viewed from the top. Light traveling through the waveguide 710 is drawn to the antenna 712 forming an extremely focused hot spot at the pointed tip of the antenna 712. The surface diffusion inhibitor layers 714, 716 and 718 are utilized to prevent surface diffusion of atoms of the nano-beak antenna 712.

In summary, an improved magnetic head is disclosed. The magnetic head has a surface diffusion inhibitor layer disposed between the antenna and the aperture. The surface diffusion inhibitor layer is made of a material that has a higher melting point than the antenna and is immiscible with the antenna. Thus, during operating, surface diffusion of atoms of the antenna caused by high temperature is prevented by the surface diffusion inhibitor layer.

While the foregoing is directed to embodiments of the present invention, other and further embodiments of the invention may be devised without departing from the basic scope thereof, and the scope thereof is determined by the claims that follow.

What is claimed is:

1. A heat assisted magnetic recording head, comprising:
    a near field transducer, wherein the near field transducer comprises:
        an antenna having a first melting point;
        a surface diffusion inhibitor layer disposed on a portion of the antenna, wherein the surface diffusion inhibitor layer has a second melting point that is greater than the first melting point; and
        an aperture disposed over the surface diffusion inhibitor layer.

2. The heat assisted magnetic recording head of claim 1, further comprising:
    a first conductive layer disposed over the near field transducer;
    a magnetic lip disposed over the first conductive layer;

a second conductive layer disposed over the first conductive layer and over vertical sides of the magnetic lip;
a heat sink disposed over the second conductive layer; and
a write pole disposed over the heat sink, the second conductive layer and the magnetic lip.

3. The heat assisted magnetic recording head of claim 2, wherein the surface diffusion inhibitor layer is an Au alloy including a material selected from the group consisting of Rh, Ru, W, Mo, Ir, Co, Pt, B and Ni.

4. The heat assisted magnetic recording head of claim 3, wherein the surface diffusion inhibitor layer has a thickness of less than 10 nm.

5. The heat assisted magnetic recording head of claim 2, further comprising an adhesion layer disposed on the surface diffusion inhibitor layer, wherein the adhesion layer includes a material selected from the group consisting of Si, Ta, Ti, Zr, Cr, Hf, NiTa, NiCr, NiTi, NiHf, and NiZr.

6. The heat assisted magnetic recording head of claim 5, wherein the adhesion layer has a thickness of less than 5 nm.

7. The heat assisted magnetic recording head of claim 1, further comprising:
a magnetic lip disposed over the aperture covering a portion of the aperture;
a first conductive layer disposed between the magnetic lip and the aperture and over vertical sides of the magnetic lip;
a second conductive layer disposed over the antenna, vertical sides and a top surface of the aperture not covered by the first conductive layer, and vertical sides of the first conductive layer;
a heat sink disposed over the second conductive layer; and
a write pole disposed over the heat sink, the first conductive layer, the second conductive layer and the magnetic lip.

8. The heat assisted magnetic recording head of claim 7, wherein the surface diffusion inhibitor layer is an Au alloy including a material selected from the group consisting of Rh, Ru, W, Mo, Ir, Co, Pt, B and Ni.

9. The heat assisted magnetic recording head of claim 7, further comprising an adhesion layer disposed on the surface diffusion inhibitor layer, wherein the adhesion layer includes a material selected from the group consisting of Si, Ta, Ti, Zr, Cr, Hf, NiTa, NiCr, NiTi, NiHf, and NiZr.

10. The heat assisted magnetic recording head of claim 1, further comprising:
a first conductive layer disposed over the aperture;
a magnetic lip disposed over the first conductive layer covering a first portion of the first conductive layer;
a second conductive layer disposed over the antenna, vertical sides of the aperture, a second portion of the first conductive layer, and vertical sides of the magnetic lip;
a heat sink disposed over the second conductive layer; and
a write pole disposed over the heat sink, the second conductive layer and the magnetic lip.

11. The heat assisted magnetic recording head of claim 10, wherein the surface diffusion inhibitor layer is an Au alloy including a material selected from the group consisting of Rh, Ru, W, Mo, Ir, Co, Pt, B and Ni.

12. The heat assisted magnetic recording head of claim 10, further comprising an adhesion layer disposed on the surface diffusion inhibitor layer, wherein the adhesion layer includes a material selected from the group consisting of Si, Ta, Ti, Zr, Cr, Hf, NiTa, NiCr, NiTi, NiHf, and NiZr.

13. A heat assisted magnetic recording head, comprising:
a near field transducer, wherein the near field transducer comprises:
an antenna, wherein the antenna has a first end at a media facing surface and a second end adjacent to a waveguide core;
an aperture disposed over the antenna;
a first surface diffusion inhibitor layer disposed between the antenna and the aperture;
a second surface diffusion inhibitor layer disposed between the second end of the antenna and the waveguide core; and
a third surface diffusion inhibitor layer disposed on the first end of the antenna at the media facing surface.

14. The heat assisted magnetic recording head of claim 13, further comprising:
a conductive layer disposed over the aperture;
a magnetic lip disposed over the conductive layer; and
a main pole disposed over the magnetic lip, wherein the aperture, the conductive layer, the magnetic lip and the main pole each has an end at the media facing surface.

15. The heat assisted magnetic recording head of claim 14, wherein the third surface diffusion inhibitor layer is disposed at the media facing surface that covers the end of the aperture, the conductive layer, the magnetic lip and the main pole.

16. The heat assisted magnetic recording head of claim 13, wherein the antenna has a first melting point and the first, second and third surface diffusion inhibitor layers have a second melting point that is greater than the first melting point.

17. The heat assisted magnetic recording head of claim 16, wherein the first, second and third surface diffusion inhibitor layers are an Au alloy including a material selected from the group consisting of Rh, Ru, W, Mo, Ir, Co, Pt, B and Ni.

18. A heat assisted magnetic recording head, comprising:
a first cladding material;
a waveguide core disposed on the first cladding material;
a second cladding material disposed on the waveguide core; and
an antenna surrounded by multiple surface diffusion inhibitor layers, wherein the antenna and the surface diffusion inhibitor layers are embedded in the second cladding material, and wherein the antenna has a tapered point at a media facing surface.

19. The heat assisted magnetic recording head of claim 18, wherein the antenna has a first melting point, and the multiple surface diffusion inhibitor layers have a second melting point that is greater than the first melting point.

20. The heat assisted magnetic recording head of claim 19, wherein the multiple surface diffusion inhibitor layers are an Au alloy including a material selected from the group consisting of Rh, Ru, W, Mo, Ir, Co, Pt, B and Ni.

* * * * *